Aug. 14, 1951

W. A. MARRISON 2,564,439

STANDARD FREQUENCY SYSTEM

Filed Oct. 30, 1946

INVENTOR
W.A. MARRISON

BY
Robert J. Pluskey
ATTORNEY

Aug. 14, 1951  W. A. MARRISON  2,564,439
STANDARD FREQUENCY SYSTEM
Filed Oct. 30, 1946  2 Sheets-Sheet 2
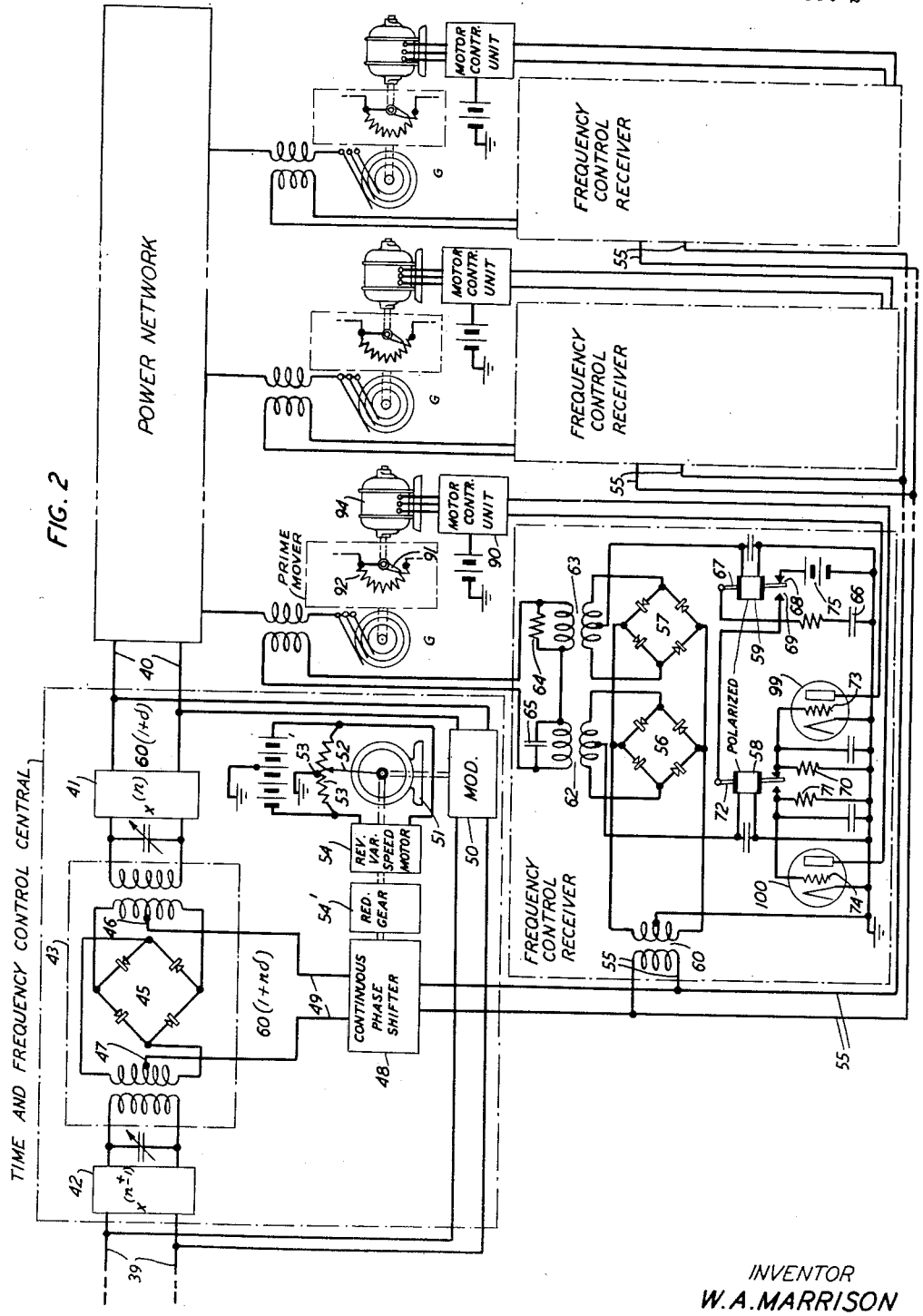
INVENTOR
W.A.MARRISON
BY
Robert J. Pluskey
ATTORNEY Patented Aug. 14, 1951

2,564,439

UNITED STATES PATENT OFFICE 2,564,439

STANDARD FREQUENCY SYSTEM

Warren A. Marrison, Maplewood, N. J., assignor to Bell Telephone Laboratories, Incorporated, New York, N. Y., a corporation of New York Application October 30, 1946, Serial No. 706,591

7 Claims. (Cl. 171—119)

This invention relates to standard or constant frequency systems and more particularly to such systems in which energy is transmitted to remote points for the purpose of indication or control.

It is an object of the invention to automatically maintain the frequency and integrated phase throughout a widespread standard frequency distribution system at substantially the same degree of accuracy as the master reference frequency standard without continuous comparison with the master standard of reference.

It is also an object of the invention to automatically control the frequency and integrated phase of an extensive alternating voltage network through the use of a control signal which is not the standard of reference but is a signal whose frequency is strictly proportional to the correction that should be applied to restore the system to the correct frequency, and to the correct integrated phase, or total cycles.

The invention accomplishes the regulation of the frequency and integrated phase of the standard frequency distribution system through the use of a synchronizing arrangement which requires only short intermittent checks with the distant standard of reference. These checks, or comparison periods, may be separated by considerable time intervals and the checking operation may be performed over normal transmission channels, not involving special network arrangements. The integrated phase may be controlled through much greater deviations than have heretofore been possible.

Regulation of the alternating voltage supply network is accomplished by comparing the frequency and integrated phase, or total cycles of the network at any one convenient point, with the frequency and integrated phase of a frequency derived from a suitable source, such as the standard frequency network. This comparison need only be made at one location, regardless of the geographical extent of the voltage network, since for regulatory purposes the frequency and phase are uniform throughout the network system. From this comparison, a control signal is derived which is adapted for control of the instantaneous alternating voltage frequency as well as for the control of the integrated phase, or total cycles, in the voltage network. Because this signal includes an integrated phase component the temporary interruption of its supply to one or more of the control points is of small consequence. During the period of interrupted control the summation of the phase relation between the voltage network and the standard of comparison is continued, and the magnitude of the control signal is accordingly varied. When the control signal is again supplied to the control point it exerts its demand for increased or decreased output as required to reduce the integrated phase difference. This demand continues until the network frequency and phase relations are again in agreement with the standard of reference. One advantage of such a system is that control operations may be automatically resumed after an interruption period without recourse to auxiliary checking operations to determine the relation between the actual and desired phase conditions at the controlled point.

The control signal may be "weighted" to cause varying degrees of control to be exerted on individual generating units. The degree of control may be made to depend upon the load frequency characteristic of the controlled unit and thus reduce the circulating currents and power loss in the connecting tie lines between various generating units.

These and other features of the invention may be more readily understood from the following detailed description when read in conjunction with the drawing, in which:

Figs. 1 and 2 are conjugate and together display a standard frequency network for the control of geographically separated time indicating devices and power supply systems.

Fig. 1 illustrates the synchronizing link between the primary reference standard and one of the secondary reference standards;

Fig. 2 illustrates the control features of the invention as applied to an extensive power supply network; and Fig. 3 illustrates diagrammatically the relation between the position of the receiving cam and the receipt of the synchronizing pulse in the synchronizing arrangement of Fig. 1.

Figures 1, 3:
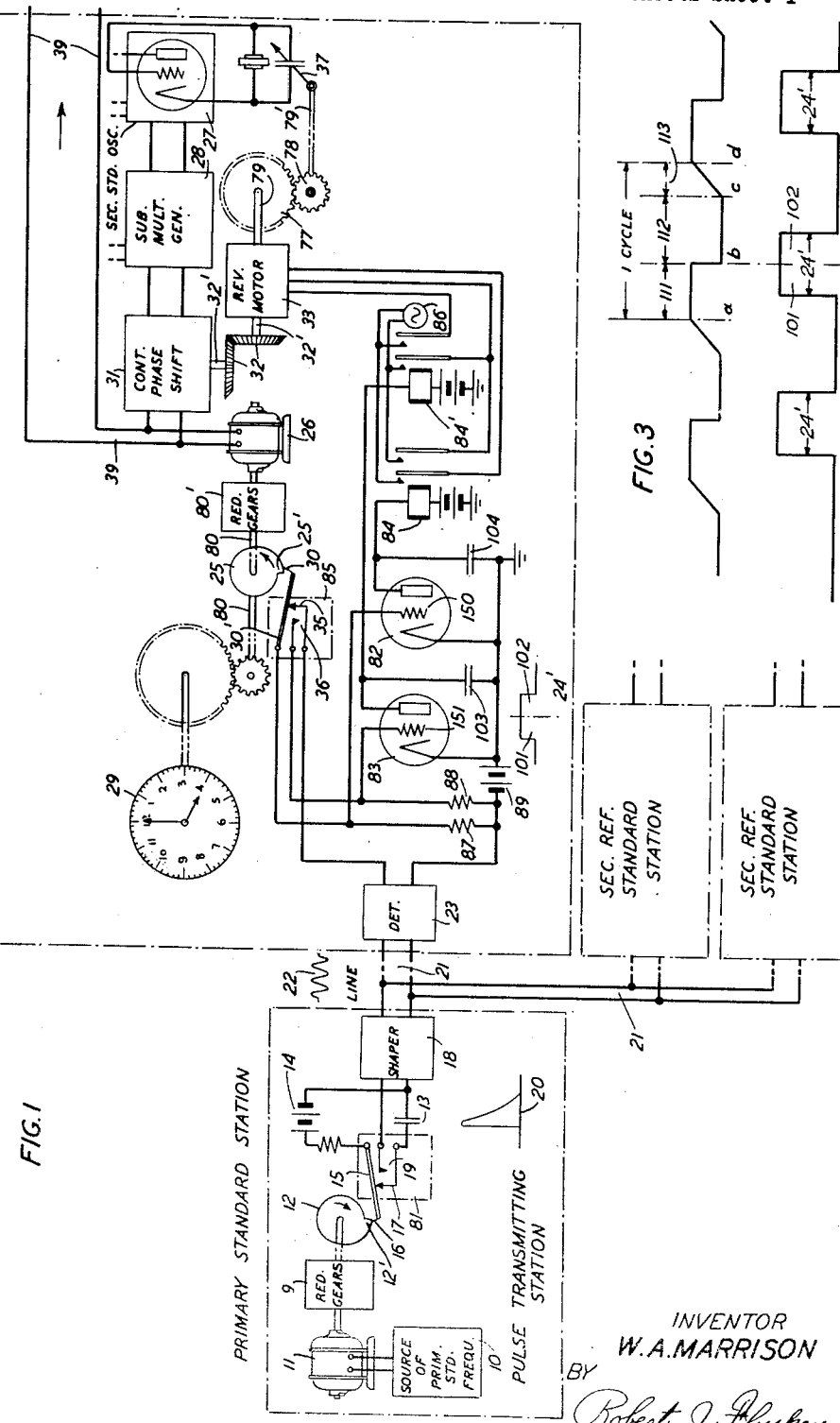

For the purpose of this description the term "integrated phase" shall be defined as the actual cumulative cyclical variations performed by the voltage or current in a system after any designated reference instant. This quantity may be expressed in any convenient unit. Similarly, the term "indicated integrated phase" shall be defined as the apparent sumulative cyclical variations performed by the current or voltage in a system as registered on a device controlled by that current or voltage.

At the primary standard station (Fig. 1) a transmitting cam 12 is rotated by the synchronous motor 11 which is energized in its synchronous operation by the primary standard frequency source 10. Although not shown, a time indicating device is also actuated by the synchronous motor 11. This source, clock and motor may be of any suitable design, for example, one such as described by W. A. Marrison in an article entitled "The Crystal Clock," published in the Proceedings of the National Academy of Sciences, volume 16, July, 1930, pages 496–507. The multiple contact contactor 81 is operated by the action of its pallet 16 riding on the circumference of the cam 12. During the greater part of the cam's rotational cycle the pallet spring 15 is forced against contact 17 with sufficient force to open the normally closed connection between contacts 17 and 19. During this period the condenser 13 is charged by the voltage source 14 and the input of the shaper unit 18 is open. When the cam 12 has rotated sufficiently the pallet 16 drops into the notch 12', thereby breaking the connection between the pallet spring 15 and the contact 17, and permitting connection to be made by contact follow action between contacts 17 and 19. Connection of contacts 17 and 19 places the condenser 13, with its voltage charge, across the input of the shaper unit 18 where the condenser delivers a pulse having a steep front and an exponential decay as indicated by pulse form 20. The shaper unit 18 may be of any suitable design, of which several are well known in the art, for shaping the pulse form 20 into a precision pulse for controlling a synchronizing signal, such as the spurt of carrier frequency oscillations 22, to be transmitted by way of the transmission channel 21 to the secondary standard station. Detector unit 23 converts the signal into a short rectangular pulse 24' which may be used for synchronizing purposes, as will be presently described.

The receiving cam 25, having a notch 25', is continuously rotated by the shafts 80 and reducing gears 80' which are connected to the rotor of the synchronous motor 26. This motor 26 operates on power obtained from the submultiple generator 28 by way of the continuous phase shifter 31, which power is a submultiple frequency of the power derived from the secondary standard oscillator 27. The submultiple generator 28 may be any of several well-known designs, one of which is the relaxation type of oscillator. The continuous phase shifter may also be of any desired type, of which several are well known in the art, one example being the phase shifter disclosed in United States Patent 2,087,326, dated July 20, 1937, to W. A. Marrison. The rotor of this phase shifter is connected to the reversing motor 33 by way of the gears 32 and the drive shafts 32'. The reversing motor 33 also controls the position of the condenser rotor 37, in the tuning circuit of the secondary standard oscillator 27, through rotation of the shaft 79 which is attached to the motor rotor. Rotation of shaft 79 actuates the gears 77 and 78, as well as shaft 79', attached to the condenser rotor 37. In addition to the receiving cam 25, the synchronous motor 26, through rotation of the rotor shaft 80, controls the movement of the time indicating device 29 and any time service commutators (not shown) that may be desired.

The continuous rotation of the receiving cam 25 operates the receiving contactor 85 even though no control pulses are being received at the time. As later described in more detail, the system may be periodically checked for synchronous operation by receiving one or more accurately timed electric pulses from the transmitting station and comparing the receiving pulses, or divided portions of a received pulse, for inequalities in time duration. Any such inequality brings into operation control forces which cause rotation of the reversing motor 33. The direction and duration of this rotation is a function of the degree and kind of asynchronism existing between the primary standard source 10 and the secondary standard oscillator 27. The rotation of the motor 33 causes rotation of the continuous phase shifter 31 which, in the well-known manner, introduces a corresponding phase shift in the output of the submultiple generator 28. As this generator output furnishes power for the synchronous motor 26 the shifted phase immediately displaces the position of the receiving cam 25 and the time indicating device 29, as well as any time service commutators (not shown) which may be operated from the rotor shaft 80. This displacement advances or retards these devices so that, on each correction, the indicated time 29 corresponds with the indicated time (not shown) controlled by primary standard source 10, and the receiving cam 25 is restored to its proper angular relation with respect to the transmitting cam 12. Rotation of the motor 33 also displaces the condenser rotor 37 to change the frequency of the secondary standard oscillator 27. The magnitude of the frequency change should be such that the accumulated frequency error during the next free operating period will be less than during the preceding period, and will depend upon the stability of the oscillators and the maximum interval between checking periods selected for any particular installation. For crystal controlled, bridge-stabilized, oscillators the time correction should never exceed .01 second in a day, which is equivalent to a frequency adjustment of about one part in a hundred million. Although only relatively small cyclical variations may be expected in normal operation the invention provides control means for much greater variations. This aspect of the invention will be more fully discussed in the description of Fig. 3.

In this described embodiment the receiving cam 25 is initially oriented on its drive shaft 80 so that for synchronous operation between the transmitting and receiving motors 11 and 26, respectively, the received pulse is divided into equal portions. The receiving cam 25 and contactor 85 are substantially the same in construction and operation as the transmitting cam 12 and contactor 81. The pulse 24' is received from the detector 23 and the first portion 101 is delivered to control grid 150 of electron tube 82 by way of the connection between the contact 35 and the pallet spring 30'. At a time corresponding to the time the pallet 30 drops into the cam notch 25', contacts 35 and 36 are connected by contact follow action. The connection to the control grid 150 is thereby opened, and the second portion 102 of the pulse is delivered to the control grid 151 of electron tube 83 by way of the connection between contacts 35 and 36. Electron tubes 82 and 83 are normally made non-conductive by the negative grid bias from source 89. The portions 101 and 102 of the divided pulse 24' are impressed across grid resistors 87 and 88, respectively, in opposite polarity to this grid bias and render the tubes conductive during their respective pulse periods. Relays 84 and 84' are operated by plate current flow in their respective control tubes and control the direction and duration of rotation of the reversing motor 33 which in turn controls the amount of correction to be applied as previously explained. Condensers 103 and 104 are shunted between the anode and cathode of the respective control tubes to effectively proportionally lengthen the effect of the control pulses by holding their associated relay 84 or 84' in the operated condition, after plate current ceases flowing, for a period that is proportional to the duration of plate current flow. In this manner each portion 101 and 102 of the received pulse exerts a control influence on the frequency of the secondary standard oscillator and the position of the receiving cam 25. If the portions 101 and 102 are of equal duration no net correction is applied. If the portions are unequal a net "slow" or "fast" correction is applied since the reversing motor 33 turns through more revolutions in one direction than in the opposite direction and the condenser rotor 37 and the rotor of the continous phase shifter 31 are angularly displaced a slight amount with the result as previously described.

This action has the effect of a feedback circuit in its self-correcting properties. In operation the frequency adjustment of the secondary oscillator 27, caused by movement of the condenser rotor 37 in its tuning circuit, is such that the accumulated frequency error during the next uncontrolled period will be less than during the preceding period. The magnitude of the correction will then be fashioned for the maximum expected interval between checking periods. If the interval between check periods greatly exceeds the expected interval used in determining the magnitude of the correction, the system may overcorrect and "hunt" about the correct frequency.

At this point it would be well to note the wide phase variation that may occur between sucsive check periods without impairing the accuracy of the control over the integrated phase. Refer to Fig. 3 wherein are shown curves illustiative of the operation of the receiving cam 25 in transferring the connections of the contactor 85. Assume, for example, the use of a reference frequency of 50,000 cycles per second, a pulse 24' of .1-second duration, and a rotational speed of four revolutions per second for the transmitting and receiving cams 12 and 25, respectively. The period 111, from point "a" to "b," represents .1 second during which the pulse is passed to electron element 82, by way of contact 35 and pallet spring 30', to cause increasing speed. The contact changeover occurs at point "b" and during the next .1-second interval 112, from point "b" to "c," the pulse is passed to electron element 83, by way of contacts 35 and 36, to cause decreasing speed. During the .05-second interval 113 from point "c" to "d" the contactor connections are restored to their original condition. The actual time of contact restoration during this period is not critical. If the entire pulse of .1-second duration, corresponding to 5000 cycles, is received during the interval 111 an "advance" signal is generated. Conversely, if the pulse is entirely within the interval 112 a "retard" signal is generated. If no phase difference exists the received pulse will be equally disposed about the changeover point "b." From this relation it is apparent that the integrated phases of the primary and secondary standards 10 and 27 may shift at least 2500 cycles without impairing the system's control of the integrated phase of the secondary standard 27. This represents a great improvement over most of the prior art synchronizing arrangements, which it is understood, have been limited to a permissible phase shift of approximately one-quarter cycle of the synchronizing frequency.

The reversible correcting motor 33 may be any of numerous commercial types. One type is a motor having two rotors, each with a separate input circuit, for the direction of rotation desired. Shaded pole motors having a single rotor may be made reversible by the use of wound shaded poles which may be connected for either direction of rotation by the control relays 84 and 84'.

For the frequency regulation of the power supply network the time and frequency control central unit (Fig. 2) receives properly phased 60-cycle standard frequency over the interconnecting circuit 39, and receives a power network frequency over interconnecting circuit 40, which frequency may vary by $\pm 60\delta$ cycles per second from the correct value. The control signal is one whose frequency difference from the customary power network frequency is the sum of two parts; one part being proportional to the instantaneous frequency error, and the other proportional to the time or integrated phase error. The part which is proportional to the frequency error is obtained by modulating the $(n)$th harmonic of the power network frequency with the $(n\pm 1)$th harmonic of the reference standard. The harmonic frequencies are obtained from harmonic generators 41 and 42 which may be of the overloaded vacuum tube type working into tuned output circuits selective of the desired harmonic. The modulation is performed in a conventional bridge type unit 43 using copper oxide or other suitable rectifier elements 45, and the low frequency difference product $[60(1\pm n\delta)]$ appears between the transformer secondary mid-points 46 and 47. The modulation process and its attendant useful signal product may best be visualized by assigning an arbitary value to the $(n)$th harmonic. Assuming $(n)$ equals 10, and the instantaneous power frequency to be $60(1\pm\delta)$ cycles per second, then the $(n)$th harmonic of the power network frequency is $[60(1\pm\delta)]\times 10$ cycles per second. In this case the ninth harmonic of the 60-cycle standard of reference or 540 cycles per second might be used. The combination of these frequencies in the modulator 43 results in a difference frequency of $60(1\pm 10\delta)$ cycles per second appearing between terminals 46 and 47. This signal varies from the correct power network frequency by an amount proportional to the instantaneous network frequency error, and is applied over the interconnecting circuit 49 to the stator of the continuous phase shifter 48 for further modification by the addition of the integrated phase difference intelligence.

The phase comparison branch performs a continuous determination of the phase relation between the voltages in the power network and in the standard frequency circuit. This comparison is performed by a double-balanced split phase modulator 50, one type of which was disclosed by W. A. Marrison in United States Patent 1,762,725, dated July 10, 1930. A split phase motor 51 of suitable type is operated by the low frequency quadrature power output of the modulator 50. The direction of rotation of the split phase motor 51 depends upon which of the two compared frequencies is the higher. The speed and duration of rotation depends upon the magnitude and duration of the frequency difference. Operation of the motor 51 positions the movable contact 52 of the variable impedance 53 in the control circuit of the reversible variable speed motor 54. The position of contact 52 with respect to the mid-point 53', determines the direction and speed of rotation of the reversible motor 54 and of the connected rotary element of the continuous phase shifter 48. If there is no discrepancy in the integrated phase, or total cycles, of the two systems under comparison the contact 52 will be in the mid-position 53' and the motor 54 will be stationary. The rotor of the phase shifter 48 will be stationary and the phase shifter will transfer the output of the modulator 43 without change to the interconnecting circuit 55.

If there exists a difference in the integrated phase of the two systems the contact 52 will be displaced from its mid-position 53' by an amount proportional to the accumulated difference between the systems. The speed and direction of rotation of the rotor of the phase shifter 48, as controlled by the reversing motor 54, determines the algebraic sign and the magnitude of the correction to be added to the frequency component as received from the interconnecting circuit 49. The final signal product as delivered by the phase shifter 48 to the interconnecting circuit 55 has a frequency expressed as $60(1 \pm n\delta) \pm a(T\delta - T_0)$ cycles per second. The portion $60(1 \pm n\delta)$ represents the component contributed by the instantaneous frequency difference between the compared systems and $n$ represents the harmonic of the power frequency used in the comparison. The signal portion expressed as $a(T\delta - T_0)$ represents the component of frequency that was added or subtracted by the rotary element of the phase shifter 48, where $a$ is a constant of proportionality that will in general depend upon the relative importance attached to the two components, namely frequency and integrated phase, or time, and $(T\delta - T_0)$ represents the discrepancy in cycles between the reference standard voltage and the power network voltage at an instant corresponding to the instantaneous frequency of $60(1 \pm \delta)$ cycles per second. In order to properly coordinate these two components a gear reduction 54' is employed between the reversing motor 54 and the phase shifter 48. The constant $a$ and therefore the proportionate amount of control exerted by the phase component would be determined by the gear ratio used. In this manner the controlling effect of the signal may be varied to meet certain operating conditions.

It should be noted that when contact 52 is displaced from its mid-position by any amount, corresponding to a given number of revolutions of the motor 51, it will be necessary for the motor to make an equal number of revolutions in the opposite direction to restore it to mid-position. This condition can only occur after there has been accumulated an integrated phase difference equal and opposite to that which caused the original displacement of the contact 52. The reversible variable speed motor 54 is substantially the same as the reversible motor 33 in the synchronizing branch of the system. The continuous phase shifter 48 may consist of inductive elements, such as disclosed in United States Patent No. 2,087,326 dated July 20, 1937 to W. A. Marrison, or capacitative elements may be used as described by L. A. Meacham in United States Patent 2,004,613, dated June 11, 1935.

The composite control signal, having a frequency as previously described, is transmitted by way of interconnecting circuits 55 to any number of power generating stations where it is received and compared with the frequency of the voltage generated at that station. From this comparison there is made available a low frequency signal having quadrantally spaced voltages which may be utilized for controlling the operation of the various generating equipments. At each control point there is provided a frequency control receiver that may be as indicated in Fig. 2. The control signal frequency is received over circuit 55 and applied through transformer 60, the secondary winding of which is center-tapped, to the two modulator units 56 and 57 in parallel connection. The frequency of the power supply contributed by the controlled generating unit G, is also applied to the frequency control receiver unit through transformers 62 and 63 each having center-tapped secondary windings. The primary of transformer 63 is shunted by a resistive impedance 64 whereas a capacitive impedance 65 shunts the primary of transformer 62 and the combinations are arranged in a series circuit. Since the same current flows through both impedances and the impedance elements are so chosen as to be of equal magnitude, the voltage drop will be the same for both elements. However, the voltage drop across the capacitive element 65 will be 90 degrees out of phase with the voltage drop across the resistive element 64. This phase displacement results in a 90-degree phase displacement in the power frequency voltages supplied to modulators 56 and 57. As each modulator 56 and 57 produces a product the frequency of which is equal to the difference between the frequencies of the voltages that are supplied to that modulator, it is apparent there will be produced two low frequencies which are separated in phase by 90 degrees. The polar relays 58 and 59 operate from these low frequency products of modulators 56 and 57 respectively, and hence operate in quadrature. The relay 59 associated with the modulator 57 serves to transfer the capacitor 66 from a charge to a discharge condition. On negative half cycles of the low frequency product the armature 67 connects with contact 68 to charge the capacitor from battery source 75. On positive half cycles the armature moves over to the discharge position by engaging contact 69 so that the accumulated charge of condenser 66 causes a current to flow through the armatures 67 and 72 and through either resistor 70 or 71 depending upon which contact the armature 72 engages. Whether the current flows in resistor 70 or 71 depends on whether the operation of relay 58 leads or lags the operation of relay 59. This in turn depends upon whether the power frequency is higher or lower than the control signal frequency. Thus, in the cited example, if the control signal frequency is high and calls for a decrease in the power frequency, the relay 59 will lead the relay 58 in operation, and the current flow will be through the resistor 70 thereby developing a positive voltage which is applied to the grid 73 of the triode element 99. This bias so increases the space current that control units are operated in the motor circuit 90. Operation of these units controls the direction of rotation of reversible motor 94 which in turn controls the output of generating unit G by controlling the variable impedance 92 in the field excitation circuit of a prime-mover to reduce the speed of the unit. Conversely, if the power system frequency should be increased, the quadrature relation of the low frequency voltages is reversed and the relay 58, associated with the modulator 56 will now operate before the relay 59 operates. The condenser 66 will now be discharged through the conducting path including the armatures 67 and 72, the left contact of relay 58, and the grid resistor 71 to positively bias the control grid 74 and increase the plate current flow of the electron tube 100. As in the previous case, this increased plate current operates control units in the motor control unit 90, to control the direction and amount of rotation of the reversing motor 94 whereby the variable impedance 92 is decreased to increase the speed of the prime mover and generating unit G.

It is, of course, entirely practicable to operate more than one frequency control receiver at a control point. For example, if it is desired that different amounts of control be exerted for different generating units to compensate for differences in the load frequency characteristics of individual units, such an arrangement might be employed. The amount of control signal supplied to the motor control unit is proportional to the control voltage which is developed across the grid resistors 70 and 71 by the discharge of the condenser 66. This, in turn, depends upon the product of the voltage source 75, the capacity of the condenser 66 and the difference frequency existing between the control and power network frequencies. By varying the potential source 75, or the capacity of the condenser 66 the magnitude of the control signal may be adjusted. This arrangement may be used to regulate the degrees of control exerted on individual generating units by separate frequency control receivers operating at a given location.

The choice of any particular control apparatus to be used in translating the frequency control signal into an actual controlling force acting on the power generating unit will necessarily depend upon the particular type of apparatus that is to be controlled. It is evident that suitable procedures may be utilized to convert the control signal into control action through the regulation of fuel supplied to an internal combustion prime mover, or by the steam supplied to a turbine unit, or by similar devices dependent upon the physical circumstances of the case.

It should be understood that the invention is not limited to the foregoing specific showing in the drawing or description as this showing is intended merely by way of example. Various modifications within the scope and spirit of the invention will occur to those skilled in the art.

What is claimed is:

1. In a system for controlling the frequency of alternation of the voltage in an alternating voltage supply network comprising a source of reference alternating voltage, a transmission channel, an alternating voltage supply network and means for generating a alterating voltage in said network, means for comparing the instantaneous frequencies of said reference and network voltages, means for integrating the phase difference between said reference and network voltages, means connected to said transmission channel and responsive to said integrated result for modulating the product of the said comparison of instantanous frequencies, and means connected to said transmission channel for comparing the frequencies of alternation of said generating means voltage and said modulation product voltage, said last-mentioned means producing a polyphase voltage for control of the operation of said generating means.

2. In a control system for regulating the frequency and integrated phase of the voltage in an alternating voltage supply network, including a source of reference alternating voltage, a transmission medium, generating means for generating alternating voltages in said network, and means for comparing the frequency and phase relations of said reference and network alternating voltages, the method comprising modulating a harmonic frequency of the alternating voltage in said network with a different harmonic frequency of the alternating voltage in said reference source, modulating a harmonic frequency of the alternating voltage in said network with the same harmonic frequency of the alternating voltage in said source, combining the products of said first and second-mentioned modulation processes into a single alternating voltage, and combining said last-mentioned voltage with the alternating voltage being supplied by said generating means to obtain a polyphase control signal, adapted for control of the frequency of said alternating voltage supplied by said generating means.

3. In a time and frequency control system comprising a main control station, a transmission medium, and a plurality of geographically separated auxiliary time and frequency control stations connected by said medium, said main station including a source of primary reference frequency and a mechanism controlled thereby for sending out accurately timed electrical pulses, said auxiliary stations comprising a secondary source of reference frequencies, and a clock mechanism responsive to one of said secondary frequencies for integrated phase indications, means at said auxiliary control station for intermittently receiving said pulse from said main control station, means for accurately resolving said received pulse into at least two portions, means for accurately comparing the portions of said divided pulse to determine any inequality in time duration, and means for simultaneously controlling the frequencies generated and the indicated integrated phase at each of said auxiliary stations in response to any inequality of time duration of said portions of said received pulse as disclosed by said comparison.

4. In a time and frequency control system comprising a main control station including a source of primary reference frequency and a source of accurately time-spaced electrical pulses controlled by said reference frequency, a transmission medium connected thereto and a plurality of geographically separated auxiliary control stations connected by said medium, each of said auxiliary stations including a source of secondary standard frequency current definitely related to the frequency of said primary frequency source, means controlled by said source of secondary standard frequency for generating frequencies that are submultiples of said secondary standard frequency, a time indicating system controlled by one of said submultiple frequencies, and a mechanism responsive to said accurately time-spaced electric pulses received over said transmission medium for simultaneously controlling the frequency of said oscillations generated as said secondary standard frequency and controlling the integrated phase indicated by said indicating system.

5. A time and frequency control system comprising a main control station, a geographically separated auxiliary control station, a time and frequency control central station and a plurality of frequency control units, an alternating current supply network, a plurality of alternating current generating units, and connecting means interconnecting said network, control stations and frequency control and generating units, said main control station comprising a primary source of reference frequency and a source of accurately timed electric pulses, said pulse source being controlled by said reference frequency, each of said auxiliary stations comprising a secondary source of reference frequency, a submultiple generator controlled by said secondary source, a time indicating device responsive to said submultiple generator, and a mechanism for simultaneously controlling the frequency of the secondary reference current and the indication of said time indicating device, means at said auxiliary control stations for intermittently receiving said accurately timed electric pulses from said main control station, means for accurately dividing said pulse and comparing the divided portions for time inequality, means responsive to said time inequality for actuating said mechanism for controlling the secondary reference current frequency, the time indicating device, and the frequencies of said submultiple generator, means at said time and frequency control central station for comparing the frequency and integrated phase relations between the current in said supply network and a current generated by said controlled submultiple generator to derive a control signal the frequency of which indicates the correction necessary to restore the alternating current in said supply network to the correct frequency and number of cycles, means at each frequency control unit for comparing said control signal frequency with the frequency of the alternating current contributed by one of said generating units, and means for resolving the product of said comparison into a control adapted to advance or retard the frequency of the alternating current supplied to the said supply network by said generating unit.

6. In a standard frequency network system comprising a primary source of constant frequency current, a cam-operated device responsive to said constant frequency current for producing accurately spaced electric impulses, a transmission medium connected to said primary source, a geographically separated secondary source of constant frequency current connected to said transmission medium, said secondary source controlling a generator for the production of submultiple frequencies of said secondary constant frequency current, and a time indicating device responsive to one of said submultiple frequencies, at the location of said secondary source means for receiving and separating each such accurately spaced electric pulse from the primary source of reference frequency into two portions, means for determining the instant of division between such two portions as a function of the frequency and indicated integrated phase of said secondary standard, and means for exercising a corrective control upon the frequency and phase of said secondary standard and for correcting the time indicated by said time indicating devices dependent upon the inequality of the portions into which each such pulse is divided.

7. In a system for controllng the frequency of the voltage in a power supply network comprising, a source of reference frequency, a transmission medium, a frequency control central unit and a plurality of geographically separated frequency control units associated with the various power generating units of the power network, said frequency control central unit comprising means for generating a harmonic of the instantaneous power frequency and a different harmonic of the instantaneous standard reference frequency, means for modulating one harmonic frequency by the other of said harmonic frequencies, means for continuously comparing and integrating the phase relationship between said power frequency and standard reference frequency, and means for changing the frequency of the product of said first modulation process in accordance with the integrated phase difference of the two compared sources to derive a control signal whose frequency difference from the power network frequency is strictly proportional to the correction that should be applied to restore the correct frequency and the total cycles in the power network.

WARREN A. MARRISON.

REFERENCES CITED

The following references are of record in the file of this patent:

UNITED STATES PATENTS

| Number | Name | Date |
| --- | --- | --- |
| 1,647,192 | Nyquist | Nov. 1, 1927 |
| 2,036,268 | Geiselman | Apr. 7, 1936 |
| 2,104,801 | Hansell | Jan. 11, 1938 |